Patented May 20, 1941

2,242,492

UNITED STATES PATENT OFFICE 2,242,492

PROCESS FOR THE PRODUCTION OF BERYLLIUM COMPOUNDS

Helmut von Zeppelin, Bitterfeld, Germany, assignor, by mesne assignments, to Walther H. Duisberg, New York, N. Y.

No Drawing. Application April 1, 1939, Serial No. 265,509. In Germany April 5, 1938

2 Claims. (Cl. 23—24)

This invention relates to a process for the production of beryllium compounds which are free from fluorine.

Minerals containing beryllium are usually decomposed by treatment with fluorine compounds, such as hydrofluoric acid or ammonium fluoride, yielding solutions containing the beryllium in the form of a fluoride. Since the production of metallic beryllium from such fluoride compounds is attended with difficulties, it is frequently preferable to produce the metal from an oxide or chloride of beryllium.

The present invention accordingly aims at converting the beryllium fluoride or beryllium double fluoride contained in such solutions, into beryllium oxide or beryllium chloride, while separating out the fluoride therefrom in the form of an insoluble compound.

To this end, according to the invention, aqueous solutions of the foregoing kind, containing beryllium in the form of fluoride, are treated with a solution of a caustic alkali or with ammonia, in the presence of an electrolyte, the cation of which is capable of forming an insoluble fluoride (for instance calcium chloride, magnesium chloride, magnesium sulphate) whereby the beryllium is precipitated out in the form of its hydroxide, while the fluorine is precipitated in the form of an insoluble fluoride.

The presence of the aforesaid electrolyte is necessary when the beryllium is present in the form of a double fluoride, in order to ensure the complete decomposition of such double fluoride and precipitation of the beryllium, in the form of its hydroxide.

The mixture of precipitates thus obtained is then treated with a solution of caustic soda or caustic potash or with a solution of an alkali metal or ammonium carbonate, so as to dissolve the beryllium hydroxide contained in the precipitate while leaving the fluoride or fluorides undissolved. In this manner solutions of beryllium compounds are obtained, which are free from fluorine and which can be easily worked up, in known manner, into beryllium oxide.

The removal of the beryllium from the mixture of precipitates is preferably effected directly after precipitation, since, as is known, the freshly precipitated hydroxide soon becomes difficultly soluble by "ageing."

This inconvenience of "ageing" may also be avoided by converting the beryllium hydroxide of the mixture into beryllium chloride, by known methods for the preparation of beryllium chloride from beryllium compounds, at an elevated temperature in the presence of carbon, and thus causing the beryllium to volatilize, in the form of its chloride, the precipitated fluoride remaining as residue. In order to avoid the formation of hydrochloric acid with its consequent reaction on the fluoride to form volatile fluorine compounds, it is, however, necessary to previously calcine the mixture to be chlorinated, for a short period, at a temperature between 500° and 700° C., so as to convert the beryllium hydroxide into the oxide. The volatilized beryllium chloride produced in the manner hereinbefore set forth can be recovered in a practically pure form by condensation.

Example 100 liters of a saturated aqueous solution containing 840 grams of calcium chloride is added to 16,000 liters of an aqueous solution of sodium beryllium fluoride containing 3.17 grams per liter of Be, calculated as BeO, which has been obtained in the decomposition of beryllium ore. To the liquid thus obtained is added ammonia liquor of 27.6% NH$_3$ concentration, until the liquid exhibits a faintly alkaline reaction. A mixture of beryllium hydroxide and calcium fluoride containing 50.6 parts by weight of BeO precipitates out. The precipitate is filtered off from the solution, washed with water, redissolved in dilute hydrochloric acid and reprecipitated by the addition of ammonia liquor. The sludge thus formed is then poured into 8,000 liters of an ammonium carbonate solution of 25% concentration and the mixture is stirred for 20 minutes at a temperature of 45° C. After filtering, the residue consisting of the difficultly soluble fluoride is washed with a dilute ammonium carbonate solution. On boiling the filtrate containing the beryllium, 113 parts of basic beryllium carbonate separate out, corresponding to 45.6 parts by weight of beryllium oxide. The yield of commercially pure beryllium oxide thus amounts to 90%, calculated on the amount of beryllium present in the starting solution.

I claim:

1. A process for the production of beryllium compounds which are free from fluorine, from solutions containing beryllium in the form of fluorine compounds, which comprises treating such solutions with a substance of the group consisting of the alkali metal hydroxides and ammonia in the presence of an electrolyte, the cation of which, belonging to the alkaline earth metal group, is capable of forming an insoluble fluoride, so as to precipitate beryllium in the form of its hydroxide together with an insoluble fluoride from such solution, and thereafter separating the beryllium hydroxide from such mixture of precipitates by treating the latter with an agent capable of dissolving only the beryllium hydroxide.

2. A process for the production of beryllium compounds which are free from fluorine, from solutions containing beryllium in the form of fluorine compounds, which comprises treating such solutions with a substance of the group consisting of the alkali metal hydroxides and ammonia in the presence of an electrolyte, the cation of which, belonging to the alkaline earth metal group, is capable of forming an insoluble fluoride, so as to precipitate beryllium in the form of its hydroxide together with an insoluble fluoride from such solution, separating the mixture of precipitates obtained from the residual solution and removing the beryllium compounds from such mixture by treating such mixture with a solution of at least one compound of the group consisting of the caustic alkalis and the alkali metal and ammonium carbonates.

HELMUT von ZEPPELIN.